(12) United States Patent
Emslie et al.

(10) Patent No.: US 10,261,242 B2
(45) Date of Patent: Apr. 16, 2019

(54) OPTICAL FIBER AND METHOD OF PRODUCING AN OPTICAL FIBER

(71) Applicant: Fibercore Limited, Chilworth, Southampton (GB)

(72) Inventors: Christopher Emslie, Chilworth (GB); Peter Maton, Chilworth (GB); Laurence Cooper, Chilworth (GB); Aurélien Bergonzo, Chilworth (GB)

(73) Assignee: Fibercore Limited, Chilworth, Southampton (GB)

(*) Notice: Subject to any disclaimer, the term of this patent is extended or adjusted under 35 U.S.C. 154(b) by 0 days.

(21) Appl. No.: 15/314,272

(22) PCT Filed: May 21, 2015

(86) PCT No.: PCT/GB2015/051502
§ 371 (c)(1),
(2) Date: Nov. 28, 2016

(87) PCT Pub. No.: WO2015/181528
PCT Pub. Date: Dec. 3, 2015

(65) Prior Publication Data
US 2017/0205574 A1 Jul. 20, 2017

(30) Foreign Application Priority Data
May 29, 2014 (GB) .................................. 1409506.1

(51) Int. Cl.
*G02B 6/02* (2006.01)
*C03B 37/018* (2006.01)
(Continued)

(52) U.S. Cl.
CPC .......... *G02B 6/02* (2013.01); *C03B 37/01853* (2013.01); *C03B 37/01869* (2013.01);
(Continued)

(58) Field of Classification Search
None
See application file for complete search history.

(56) References Cited

U.S. PATENT DOCUMENTS

| 5,000,541 A | 3/1991 | DiMarcello et al. |
| 7,752,870 B1 | 7/2010 | Homa |

(Continued)

FOREIGN PATENT DOCUMENTS

| CN | 101533108 A | 9/2009 |
| CN | 102654602 A | 9/2012 |

(Continued)

OTHER PUBLICATIONS

International Preliminary Report on Patentability for PCT/GB2015/051502 filed May 21, 2015.
(Continued)

*Primary Examiner* — Michael Stahl
(74) *Attorney, Agent, or Firm* — Howard & Howard Attorneys PLLC

(57) ABSTRACT

An optical fiber package is described comprising a light transmitting core having a core diameter, a coating layer surrounding the core, and wherein the amount of chlorine in the light transmitting core region is homogeneous and comprises at least 3000 ppm. The fiber package is such that the optical fiber core exhibits a reduction in the hydrogen induced attenuation losses. A method for fabricating the optical fiber package is also disclosed.

13 Claims, 3 Drawing Sheets

(51) Int. Cl.
*C03B 37/025* (2006.01)
*G02B 6/028* (2006.01)

(52) U.S. Cl.
CPC ........ *C03B 37/025* (2013.01); *C03B 2201/12* (2013.01); *C03B 2201/20* (2013.01); *C03B 2201/28* (2013.01); *C03B 2201/31* (2013.01); *C03B 2201/32* (2013.01); *C03C 2201/11* (2013.01); *G02B 6/028* (2013.01)

(56) References Cited

U.S. PATENT DOCUMENTS

| | | | |
|---|---|---|---|
| 8,158,688 B2 | 4/2012 | Tadakuma | |
| 2004/0139765 A1* | 7/2004 | Hirano | C03B 37/01211 65/412 |
| 2004/0240814 A1 | 12/2004 | Boek et al. | |
| 2006/0204189 A1 | 9/2006 | Sasaki et al. | |
| 2010/0266251 A1 | 10/2010 | Lyngso et al. | |
| 2012/0263427 A1* | 10/2012 | Hirano | C03B 37/01211 385/142 |
| 2013/0188917 A1* | 7/2013 | Hirano | G02B 6/02 385/127 |
| 2014/0369639 A1* | 12/2014 | Zhang | G02B 6/02214 385/11 |
| 2015/0225280 A1* | 8/2015 | Harper | C03B 37/01446 65/399 |
| 2016/0011365 A1* | 1/2016 | Berkey | G02B 6/02019 385/127 |

FOREIGN PATENT DOCUMENTS

| | | |
|---|---|---|
| EP | 1174741 A1 | 1/2002 |
| EP | 2511741 A2 | 10/2012 |
| JP | 2785430 B2 * | 8/1998 |
| WO | 02100788 A1 | 12/2002 |
| WO | 2015181528 A1 | 12/2015 |

OTHER PUBLICATIONS

Written Opinion of the International Searching Report for PCT/GB2015/051502 filed May 21, 2015.
English language abstract for CN102654602A extracted from espacenet.com database on Nov. 26, 2018, 2 pages.
English language abstract for CN101533108A extracted from espacenet.com database on Nov. 26, 2018, 1 page.
Mendez et al., Specialty Optical Fibers Handbook, Academic Press (2007), pp. 139-141, 6 pages.
Search Report for United Kingdom Application No. GB1409506.1 dated Dec. 1, 2014, 1 page.

* cited by examiner

OPTICAL FIBER AND METHOD OF PRODUCING AN OPTICAL FIBER

TECHNICAL FIELD

The present invention relates to optical fibers exhibiting a reduction in the hydrogen induced losses. Embodiments of the present invention relate to an optical fiber package exhibiting a reduction in the hydrogen induced attenuation over operating and transmitting wavelengths in the range from 1000 nm to 1600 nm and to a method of manufacturing an optical fiber package.

DEFINITIONS

As used herein, "optical" includes all forms of electromagnetic radiation, whether visible or invisible to the human eye.

"Light transmitting" includes transmittance of all forms of electromagnetic radiation, whether visible or invisible to the eye.

Reference to absorption and transmission includes absorption and transmission of all wavelengths of the electromagnetic spectrum.

BACKGROUND

Optical fibers are often used in the gas and oil industries for down-hole monitoring operations to gather and analyse borehole data. The fibers are encased in various designs of cable to ensure mechanical robustness.

Due to the high temperatures, pressures and operation within an atmosphere containing polycarbons in the oil and gas industry, along with the presence of gases and other potentially corrosive conditions in a down-hole environment, there is a need for optical fibers that are resistant to these extreme conditions and that maintain a high level of performance.

In undersea environments optical fibers are used for both sensing and communications and hydrogen is also present.

Attenuation in optical fibers and loss of performance may result from of a number of different factors such as absorption, scattering, bending losses, as well as at fiber connections. Each loss mechanism is relative to the attenuation properties of the optical fiber which are influenced by the fiber material properties and fiber structure.

Absorption is arguably the most significant cause of attenuation and performance loss in an optical fiber. Absorption may be defined as the portion of attenuation resulting from the conversion of optical power into another energy form, such as heat. Imperfections in the atomic structure of the optical fiber induce absorption by the presence of vacancy defects or oxygen defects (point defects). Silica fibers are commonly used because of their low intrinsic material absorption at the wavelengths of operation in optical fibers.

Absorption is also induced by the diffusion of hydrogen molecules into the glass fiber. The absorption of hydrogen into silica glass fiber has two mechanisms.

The first absorption mechanism is by temporary diffusion wherein hydrogen diffuses into interstitial sites in the silica network of the glass fiber. This phenomenon has been found to affect all silica-based glass fibres, both single and multi-mode.

The most significant effect of temporary hydrogen diffusion is a strong absorption at 1.24 µm. Further peaks are also observed at longer wavelengths (a rising loss edge beyond about 1.5 µm). In practice, the diffusion of hydrogen into the fibre core can be measured by the growth of the 1.24 µm peak. As the concentration of hydrogen increases, the breadth of each absorption band also increases. Overall, these absorptions prevent the transmission of light along the optical fiber at the required wavelength.

The solubility of hydrogen in bulk silica is linear with pressure; however, it decreases as temperature increases. It should be noted that the saturation level of hydrogen that can be absorbed into an optical fibre is greater than that required to optically darken the fibre and thus the effect of temperature is not significant.

The losses due to hydrogen absorption caused by the temporary diffusion mechanism are reversible. When external pressure and/or the hydrogen source is removed, the absorbed hydrogen diffuses out of the core and the light transmission characteristics are restored with time.

The second mechanism for absorption of hydrogen into silica glass fiber is a chemically induced absorption mechanism which results from chemical reaction of the diffused hydrogen with the silica glass constituents to form, for example, hydroxyl (OH) groups. These hydroxyl groups have distinctive absorption bands that lead to high attenuation of the transmitted light, a phenomenon known as 'hydrogen darkening'.

The intensity of all chemically induced absorptions increases with time as the chemical reactions proceed. The rates of reaction are also accelerated at higher temperatures (such as in down-hole environments) and at increased hydrogen concentrations. The chemical reactions are irreversible and thus once it has been created, chemically induced attenuation cannot be removed. Some examples of chemically induced absorption of hydrogen that lead to hydrogen darkening in silica fibers will now be described.

Reaction with Silica

Even for a pure silica fibre, the silica within the fibre core does not comprise a pure silicon-oxygen three-dimensional matrix (—Si—O—Si—O—). There remain some terminal sites where oxygen forms a double covalent bond to silicon (Si=O), especially at the edges of the fiber core. Under certain conditions, these can react with hydrogen to produce terminal 'dangling' hydroxyl groups (Si—OH). Alternatively, hydrogen can react with non-bridging (radical) oxygen hole centres (Si—O.) or peroxy radicals (—Si—O—O.) to produce OH groups. Hydroxyl groups absorb strongly in the transmission region of interest 1.38, 0.95 and 0.72 µm, the strongest absorption being 1.38 µm. There is also an absorption at 1.24 µm but this is often masked by the larger peak resulting from molecular hydrogen (described above).

Reaction with Dopants

Silica fibers are commonly doped with germanium (Ge), phosphorus (P) or other Group III or Group V elements. As well as reacting with the silica core of the fiber, hydrogen can also chemically react with these dopants. This can lead, for example, to the formation of Ge—OH sites which absorb strongly at around 1.4 µm. Ge-doped fibres are more susceptible to hydrogen darkening than pure silica core fibres and chemically induced attenuation is worse when both $GeO_2$ and $P_2O_5$ are present in the core of the fibre as the $P_2O_5$ catalyses the reaction with hydrogen to produce terminal germanium hydroxyl (Ge—OH) species. Additionally, reaction of hydrogen with $GeO_2$-doped fibres can also induce attenuation in the shorter wavelength region (<1 µm).

Essentially, doped fibres are not suitable for prolonged use in extreme environments, even when they have further protection from cable coating or housing.

Other Reactions

Hydrogen can also react with defects within the fiber core that contain alkali impurities (e.g. Na, Li, K, etc.). This is manifest in the growth of a long wavelength absorption edge. Additionally, hydrogen can induce attenuation in undoped fibres (pure silica cores), including those which have a fluorine-doped cladding. In this case, absorptions due to HF (1.44 µm) and SiH (1.53 µm) can be detected.

Reducing Hydrogen Attenuation Losses

Several methods to prevent hydrogen reaching the core of a silica fiber are known. Carbon coating is a well-established technique, for example, U.S. Pat. No. 5,000,541 discloses a method of applying an outer carbonaceous coating between the glass and the protective 'plastic' captures. However, ambient temperatures in gas and oil industry environments such as in down-hole operations are often well above the temperature at which an external coat of carbon prevents hydrogen ingress. The effectiveness of carbon coating decreases at temperatures above 170° C. because hydrogen molecules and atoms are very small, their mobility and diffusion increases significantly with temperature and the carbon becomes increasingly porous. There is some residual effectiveness at a typical operating temperature of 300° C. but enough hydrogen diffuses through to ensure the fiber darkens due to the chemical reactions outlined.

Internal protection of the core with additives is also known in the art. It is known to achieve fiber passivation by treating drawn fibers with deuterium at temperature. The technique is described in the '*Speciality Optical Fibers Handbook*' by Alexis Mendez and T. T. Morse, Academic Press (2007). Deuterium competes with hydrogen in reactions to form Si-OD or Si-D species whose absorption losses occur at much longer wavelengths outside normal operating ranges (>1625 nm) and thus are harmless. However, deuterium treatment is known to be expensive, potentially hazardous during fabrication, and difficult due to the post-process of passivating with deuterium is to use temperature to ensure the deuterium diffuses into the fibre. Hence the exposure time to deuterium has to be long, to ensure adequate diffusion and saturation at the maximum temperature that the fibre can withstand.

Hydrogen ($H_2$) Concentration in Operational Environments such as in Oil and Gas Industries Hydrogen is present in an oil and gas industries because of the materials used as well as the inherent environment.

Hydrogen exists in the atmosphere, but at less than 1 ppm by volume. In an oil/gas environment (for example, a down-hole environment), the natural concentration of hydrogen may be significantly greater but will still be a relatively minor component.

Hence it is normal practise to test for hydrogen induced darkening in the range between 1 atmosphere (1 bar) pressure of hydrogen as a minimum and up to 15 atmospheres of hydrogen. Although possibly an excessive test, the pressure in an oil well is high and the concentration of hydrogen is not always known before the hydrogen darkens the fiber.

Hydrogen can also be formed by the electrolytic reaction between metallic elements in cables, by water corrosion with metal components, and by the evolution of gasses from decomposition or chemical reactions of fiber coating materials. The most significant of these can be through an electrolytic reaction between different metals placed in a down-hole environment. This is a factor that is not always appreciated when the choice of materials is being made. A poor choice, combined with the presence of aqueous-based production or environmental fluids, may lead to generation of a galvanic cell and consequent production of significant levels of hydrogen.

Hydrogen sulphide ($H_2S$) is commonly found in oil/gas environments and can cause significant problems. For example, $H_2S$ in water is only mildly acidic but it will reduce iron causing deterioration. $H_2S$ may also react with polymers used on optical fiber claddings to weaken/degrade them, although normally not rapidly. In an electrically conductive solution, such as sea water, this reaction is enhanced.

$H_2S$ is also the most common and potentially troublesome source of hydrogen. At atmospheric pressure $H_2S$ reacts with 'steel' to produce molecular hydrogen. $H_2S$ also hinders the combination reaction of atomic hydrogen to molecular $H_2$ and thus the molecular hydrogen is able to start to diffuse rapidly into the steel.

In undersea environments the hydrogen is created by similar mechanisms of electrolysis, plus bacterial and algae reactions with any polymer in the presence of the sea water, in addition to the natural density of dissolved hydrogen. The pressure within the cable will be a function of the depth of the water.

There is a need to provide an optical fiber that exhibits a reduction in hydrogen induced attenuation losses (hydrogen darkening) over operating and transmitting wavelengths that can be used for prolonged periods of time in extreme conditions.

In more benign conditions recently developed low water peak (LWP) and zero water peak (ZWP) fibers are prone to react with trace levels of hydrogen, which generates a water peak which the LWP and ZWP designs intend to avoid. This invention also been developed to passivate against this effect.

We have now devised an improved optical fiber package and design that alleviates some of the above-mentioned problems.

SUMMARY OF THE INVENTION

In accordance with the present invention, as seen from a first aspect, there is provided an optical fiber package comprising a light transmitting core having a core diameter, a coating layer surrounding the core, wherein the amount of chlorine in the light transmitting core region is homogeneous and at least 3000 ppm and whereby the optical fiber core exhibits a reduction in the hydrogen induced attenuation losses over operating and transmitting wavelengths in the range from 1000 nm to 1600 nm.

Preferably, the optical fiber core exhibits a reduction in the hydrogen induced attenuation losses at a transmission wavelength of substantially 1400 nm.

Preferably, the amount of chlorine in the core is in the range from 3000 ppm to 8000 ppm. More preferably, the amount of chlorine in the core is in the range from 4000 ppm to 4500 ppm. Preferably, the uncertainty in the amount of chlorine in the core is ±120 ppm. Other levels of uncertainty may be arrived at or tolerated.

Preferably, the chlorine in the core is uniformly distributed with a variation of less than 50% across the core. More preferably, the chlorine in the core is uniformly distributed with a variation of less than 20% across the core.

The chlorine level must be high and uniform across the core or the fiber will remain sensitive to hydrogen darkening. Chlorine in the core prevents hydrogen molecules attaching themselves to silica defects and causing attenuation. This density range of chlorine in the core has been found to provide a high level of resistance to ingression of hydrogen through passivation and resistance to hydrogen darkening which cause attenuation of the optical fiber package. The uniformity of chlorine in the fiber core is crucial to impart a high level of resistance to hydrogen induced attenuation.

Preferably, the fiber package is drawn from a preform having a composition comprising silica ($SiO_2$). Preferably, the preform includes one or more dopants selected from the range of Al, Ge, F, P present in concentrations in the range from 0 to 10000 ppm.

The fiber diameter is preferably in the range from 50 μm to 500 μm and is more preferably in the range from 75 μm to 130 μm.

The core diameter is preferably in the range 3 μm to 100 μm and is more preferably in the range 5 μm to 50 μm.

Preferably, the core of the optical fiber package comprises silicon dioxide ($SiO_2$). Preferably, the optical fiber package comprises a pure silica core, a down-doped fluorine cladding and chlorine only.

Alternatively, other dopants such as Germanium (e.g. a few % weight maximum) can be considered in order to bring additional attributes to the optical fiber such as photosensitivity, while maintaining low hydrogen induced loss. Other dopants may be unintentionally present in (or intentionally added to) the core in limited quantities, for example, alumina and fluorine are typically present in the range 0 to 10,000 ppm.

In various embodiments of the present invention, the refractive index profile of the core is one selected from the range of; step profile, graded profile, m graded profile or w graded profile, or any profile which is design to control dispersion or operational bandwidth, bend enhancement or for other purposes.

The optical fiber package of the present invention has inherent resistance to hydrogen ingression at a wide range of temperatures. This is achieved by passivation of the glass fiber by incorporation of a minimum and homogenous amount of chlorine in the glass. Hydrogen molecules and atoms are prevented from attaching to the $SiO_2$ molecules and forming or enhancing defects which absorb light.

Incorporating chlorine into a pure silica core also provides an optical fiber package with increased resistance to hydrogen darkening when hydrogen has diffused into the glass. The —OH peaks caused by hydrogen reactions in the silica core are minimised. The incorporation into other doped cores would be similar and is also envisaged, for example into Germania doped core.

In accordance with the present invention, as seen from a second aspect, there is provided a method of manufacturing an optical fiber package by carrying out one or more chemical vapour deposition reactions in a substrate tube, with the optical fiber core exhibiting a low sensitivity to the hydrogen induced attenuation losses over operating and transmitting wavelengths in the range from 1000 nm to 1600 nm, the method comprising the steps of:
  i) providing an optical fiber substrate preform tube with glass forming precursors;
  ii) supplying a stoichiometric excess amount of oxygen to the tube;
  iii) generating a reaction in the substrate tube to form an amorphous glass layer on the interior of the tube;
  iv) depositing a layer of unsintered soot comprising $SiO_2$ within the tube;
  v) supplying a $Cl_2$ atmosphere;
  vi) sintering the glass layer in the tube;
  vii) collapsing the optical preform tube of step (vi) in a $Cl_2$ atmosphere so as to form a preform; and
  viii) drawing an optical fiber from the preform formed in step vii) with the application of heat and tension of weight in the range 30 to 70 g and providing an optical fiber coating.

Preferably, the optical fiber coating comprises a coating material selected from the range; polymer, acrylate, polyimide.

Preferably, the amount of oxygen supplied to the substrate tube in step ii) is in the range of 5 to 10 times the stoichiometric amount.

Preferably, the sintering step vi) is performed at a temperature in the range of 1950° C. to 2200° C.

Preferably, the preform tube has a composition of <30 ppm of water. In one embodiment, the preform tube is a natural quartz material having a composition of <30 ppm of water and low chlorine. In an alternative embodiment, the preform tube is a synthetic silica material having a composition of <30 ppm of water and low chlorine.

The pre-from tube in which the fiber is fabricated should be low in chlorine to delay the onset in time of hydrogen darkening. The absence of chlorine molecules in the silica tube enables hydrogen molecules to attach to the silica defects in the silica tube and hence not continue on to the core. The preform tube should also be low in water to ensure the silica defects do not have water molecules already attached to them. Advantageously, this extends the life of the fiber in a hydrogen atmosphere.

Preferably, the amount of chlorine in the core of the optical fiber packaging is at least 500 ppm. More preferably, the amount of chlorine in the core is at least 1500 ppm.

The method of manufacturing an optical fiber package according to the present invention provides a technique for adding chlorine to the desired doping density of and uniformity. In particular, maintaining the atmosphere of chlorine from step v) in step vii) when the optical preform tube is collapsed is essential to ensure there is a uniform distribution of chlorine across the core with no central dip.

The density and uniformity of chlorine in the fiber core are both crucial to impart a high level of resistance to hydrogen darkening. The fiber needs uniform doping since the fiber is more sensitive when the chlorine has been allowed to diffuse out of the core. This is prevented in the improved process by not allowing the presence of oxygen during the collapse phase.

The method is not limited in core size or external fiber diameter and may be used to manufacture single mode and multi-mode fibers, including fibers with designed modal profiles. Preferably, the core size is in the range 1 μm to 200 μm and the fiber external glass diameter is in the range from 50 μm to 1 mm in an appropriate combination. The modal profile management can be any that is useful for the application. Profiles include but not limited to, simple step index multi-mode profiles, graded index with alpha profiles for 1.0 to 3.0, dispersion managed (compensated and flattened) profiles otherwise known as w profiles, and bend enhanced trench profiles.

The method is relatively cheap compared to other passivation methods and requires no extra processing steps or equipment.

BRIEF DESCRIPTION OF THE DRAWINGS

An embodiment of the present invention will now be described by way of example only and with reference to the accompanying drawings, in which.

DETAILED DESCRIPTION OF THE INVENTION

Figure 1:
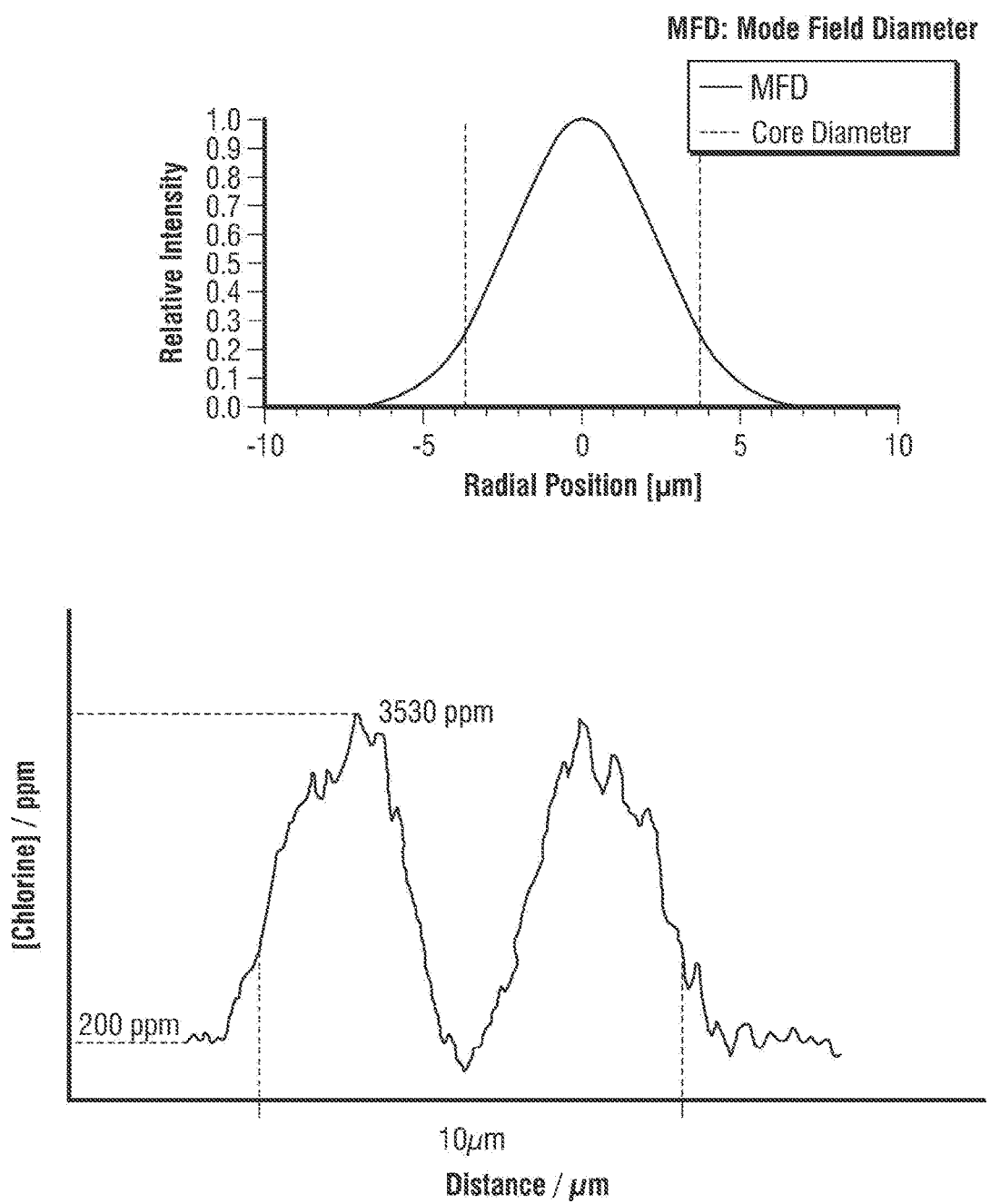
FIG. 1 shows the chlorine doping profile of a chlorine doped core of an optical fiber package wherein the amount of chlorine in the light transmitting core region is not homogeneous, fiber sample here prepared without an excess of chlorine.
Figure 2:
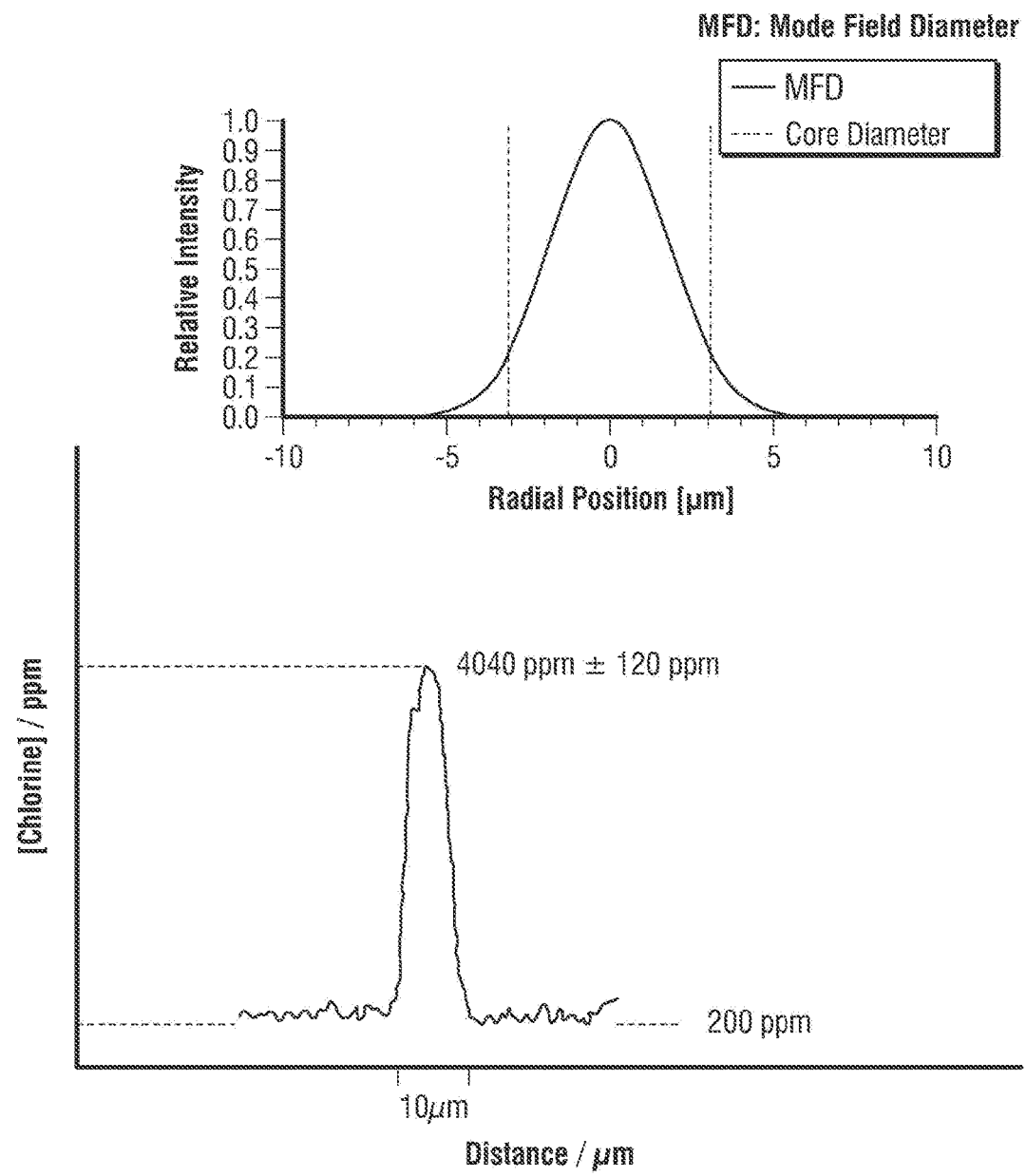
FIG. 2 shows the chlorine doping profile of a chlorine doped core of an optical fiber package of the present invention wherein the amount of chlorine in the light transmitting core region is homogeneous.

FIGS. 1 and 2 show the doping profiles of two fiber cores comprising a pure silica core doped with chlorine. The chlorine level in the core was measured using an electron microscope with a wavelength dispersive analysis system. The resolution limit of the system is <50 ppm as determined by a quartz sample, and the accuracy of measurement is ~3% with a spatial resolution of ~1 μm or less according to scan speed (for example FIG. 1 has a spatial resolution of ~200 nm and FIG. 2 is ~1 um) in the optical core which has a diameter of 5 to 12 μm. Concentration of chlorine is plotted against distance (μm) to give an indication of the distribution of chlorine across the core region.

Figure 3:
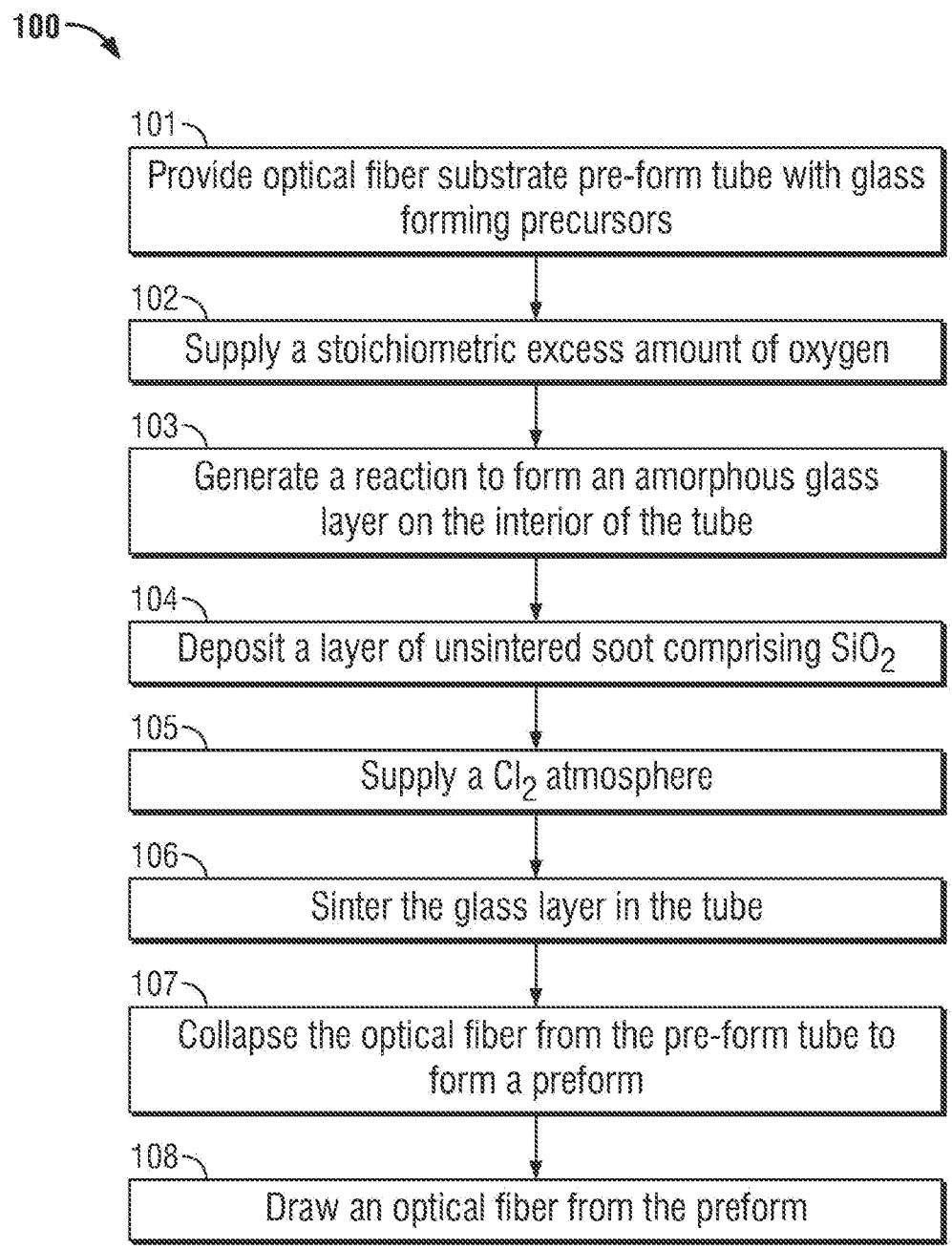
FIG. 3 illustrates a method of manufacturing an optical fiber package, wherein the resulting optical fiber core exhibits a low sensitivity to the hydrogen induced attenuation losses over operating and transmitting wavelengths in the range from 1000 nm to 1600 nm.

The profile shown in FIG. 1 corresponds to a fiber (SM1500SC(9/125)P 53008 fiber) that was doped using the method of FIG. 3 with a target chlorine doping density of the maximum that can be incorporated by supplying an excess. The excess of chlorine was not maintained in the collapse phase and therefore the chlorine doping was effectively lost from the centre of the core and was reduced from the maximum obtainable value. The plot shows two peak regions in the core where the concentration of chlorine is ~3530 ppm with a clear dip in the centre where the concentration of chlorine falls to the background level (~200 ppm). For comparison, the inset to FIG. 1 shows the light intensity profile of the single mode light transmitted by the core is plotted against distance (~m). It can be seen that most of the light is in the centre of the core where there is very little chlorine, hence why the fiber is sensitive to hydrogen induced darkening in this central region.

The profile shown in FIG. 2 corresponds to a fiber (SM1500SC(7/125)P 53037 fiber using the method of the present invention (see FIG. 3), in particular the excess of chlorine was maintained throughout the collapse phase. Again, the Gaussian mode profile of the light is shown on the inset figure. In contrast to FIG. 1, a high density of chlorine (4040 ppm±120 ppm) with uniform distribution is achieved across the core region (peak with 10 μm diameter). The uniformity of the chlorine dopant should be within 30% and preferably within 10% to achieve optimum resistance to hydrogen darkening. This uniformity is achieved by ensuring that there is no oxygen flow and an excess of chlorine in the lathe during the collapse phase of the preform when the fiber is manufactured (see FIG. 3).

The SM1500SC(7/125)P 53037 fiber (FIG. 2) was tested at 300° C. in the presence of 1 atmosphere (1 atm) of hydrogen. The test results showed only ~2 dB/km permanent loss near 1400 nm over 1000 hours and about 4 dB/km temporary loss near 1240 nm. On the other hand, the SM1500SC(9/125)P 53008 fiber (FIG. 1) which has non-uniform chlorine doping showed >30 dB/km permanent loss at around 1400 nm over only a few hours.

Referring to FIG. 3, there is shown a method 100 of manufacturing an optical fiber package by carrying out one or more chemical vapour deposition reactions in a substrate tube.

Firstly, an optical fiber substrate preform tube is provided containing glass forming precursors e.g. SiCl$_4$ (101). The glass forming precursors react with an excess of oxygen supplied to the tube (102), wherein the ratio of O$_2$ to SiCl$_4$ is in the range of 10:1 to 5:1 (the stoichiometric amount is 1:1). This reaction forms an amorphous glass layer of pure silica soot on the interior of the tube (103).

The pure silica soot is deposited (104) using a standard modified chemical vapour deposition (MCVD) technique with a low temperature (1400° C. to 1700° C.) to allow the soot particles to be adhered to the wall, but not sintered in to glass.

The tube is then filled with a pure chlorine atmosphere (105), and the glass layer is sintered (106) at a temperature between 1950° C. and 2200° C. This incorporates chlorine into the silica structure giving a pure silica core doped with chlorine. There is still a chlorine atmosphere in steps 106 and 107.

The tube is then collapsed into a rod using standard MCVD techniques (107), but with the internal atmosphere consisting of only chlorine for all stages of said collapse. Maintaining an atmosphere of chlorine is essential to ensure there is a uniform distribution of chlorine across the core with no central dip (as seen in FIG. 1).

After collapse of the preform, an optical fiber is then drawn from the preform at a high temperature 1950° C. to 2200° C. and low tension (in the range 30-70 g) to give either a 80 μm or 125 μm optical fiber. The optical fiber can then be coated, for example, with polymer, acrylate or polyimide using known methods.

The resulting optical fiber package has a core that exhibits a low sensitivity to the hydrogen induced attenuation losses over operating and transmitting wavelengths in the range from 1000 nm to 1600 nm.

The method 100 is not limited in core size or external fiber diameter and can be applied to single mode and multi-mode fibers, as well as fibers with designed modal profiles.

The invention claimed is:

1. An optical fiber package comprising an optical fiber having a light transmitting core, the light transmitting core having a core diameter and a coating layer surrounding the light transmitting core, wherein an amount of chlorine in the light transmitting core is homogeneous and at least 3000 ppm by weight and whereby the light transmitting core exhibits a reduction in hydrogen induced attenuation losses when compared with light transmitting cores not comprising chlorine that is homogeneous and at least 3000 ppm by weight, the reduction in the hydrogen induced attenuation losses observed over operating and transmitting wavelengths in the range from 1000 nm to 1600 nm.

2. An optical fiber package according to claim 1, whereby the light transmitting core exhibits a reduction in the hydrogen induced attenuation losses at a transmission wavelength of substantially 1400 nm.

3. An optical fiber package according to claim 1, wherein an amount of chlorine in the light transmitting core is in a range from 3000 ppm to 8000 ppm by weight.

4. An optical fiber package according to claim 1, wherein an amount of chlorine in the light transmitting core is in a range from 4000 ppm to 4500 ppm by weight.

5. An optical fiber package according to claim 4, wherein an uncertainty in the amount of chlorine in the light transmitting core is in a range from +/−120 ppm by weight.

6. An optical fiber package according to claim 1, wherein the optical fiber package is drawn from a preform having a composition comprising silica $SiO_2$.

7. An optical fiber package according to claim 6, wherein the preform includes one or more dopants selected from a range of Al, Ge, F, P present in concentrations in a range from 0 to 10000 ppm by weight.

8. An optical fiber package according to claim 1, wherein a diameter of the optical fiber is in a range from 50 μm to 500 μm.

9. An optical fiber package according to claim 8, wherein the diameter of the optical fiber is in a range from 75 μm to 130 μm.

10. An optical fiber package according to claim 1, wherein the core diameter is in a range from 3 μm to 100 μm.

11. An optical fiber package according to claim 10, wherein the core diameter is in a range from 5 μm to 50 μm.

12. An optical fiber package according to claim 1, wherein the light transmitting core comprises $SiO_2$.

13. An optical fiber package according to claim 1, wherein a refractive index profile of the light transmitting core is one selected from a range of: step profile, graded profile, n graded profile, w graded profile.

* * * * *